(No Model.)
G. W. ALDRICH & J. HUESTON.
WATER CLOSET CISTERN.
No. 475,371. Patented May 24, 1892.
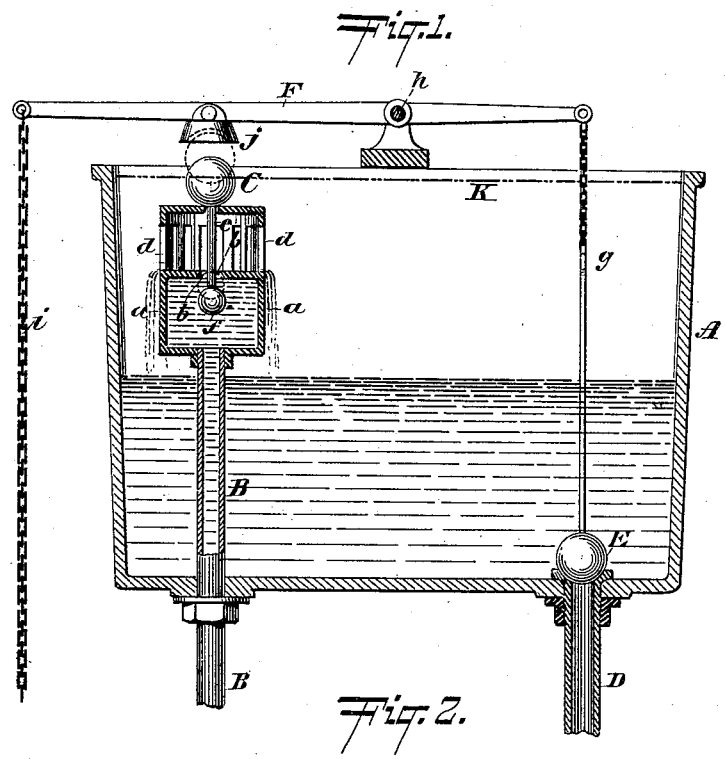
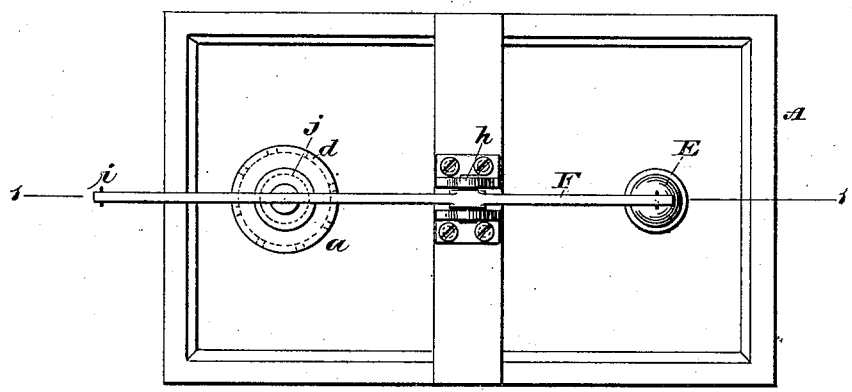
WITNESSES:
Gustave Dieterich
L. M. Wachschlager
INVENTORS
George W. Aldrich
James Hueston
BY Briesen & Knauth
their ATTORNEYS.

UNITED STATES PATENT OFFICE.

GEORGE W. ALDRICH AND JAMES HUESTON, OF BROOKLYN, NEW YORK.

WATER-CLOSET CISTERN.

SPECIFICATION forming part of Letters Patent No. 475,371, dated May 24, 1892.

Application filed July 14, 1891. Serial No. 399,501. (No model.)

*To all whom it may concern:*

Be it known that we, GEORGE W. ALDRICH and JAMES HUESTON, residents of Brooklyn, Kings county, and State of New York, have invented an Improved Water-Closet Cistern, of which the following is a specification, reference being had to the accompanying drawings, forming part hereof, wherein—

Figure 1 is a vertical longitudinal section of our improved water-closet cistern, the line 1 1, Fig. 2, indicating the plane of section. Fig. 2 is a plan or top view of the same.

This invention relates to a new valve arrangement in tanks or cisterns used for flushing water-closets and for analogous purposes; and it consists of the new arrangement and combinations of parts that are hereinafter more fully described.

The main object of the invention is to overcome the difficulties connected with the ordinary float which is connected to the faucet in such a tank, such floats and the packings of the faucets frequently giving out and producing, moreover, disagreeable hissing noises. By our invention these difficulties are entirely obviated.

In the drawings, the letter A represents the tank or cistern.

B is the inlet-pipe for the water, the said inlet-pipe having at its upper portion an enlarged chamber $a$, with an outlet or water-discharge opening $b$ at its upper end. Above this enlarged chamber $a$ is an open-work cage $d$. Above this cage, which has a central upper opening, is a float of spherical or analogous form, (marked C,) with a stem $e$ extending downward through the cage and through the aperture $b$ into the enlarged chamber $a$. The lower end of this stem $e$ carries a valve $f$, which may be in form of a solid india-rubber ball or in form of a disk, or of other suitable form.

D is the outlet-pipe for the escape of water from the tank A.

E is the valve closing the upper end of the outlet-pipe when water is not to flow therefrom. This valve is, by a rod and chain $g$, connected to a lever F, which is pivoted at $h$ to a proper support carried either by the tank A or by the wall. The free end of the lever F is connected by a chain $i$ with the ordinary pull for opening the valve E. Directly above the float C the lever F carries a block or extension $j$, which is intended to force the float C down against the top of the cage $d$ and for opening the valve $f$.

This being the construction of our apparatus, we will now describe its operation. The combined weight of the float C and valve $f$ holds the parts normally in the position which is represented by full lines in the drawings—that is to say, leaves the said float to rest on top of the cage while the valve $f$ is at such a distance below the aperture $b$ as to leave the same perfectly open. In this condition of parts the water is free to enter the tank A through the pipe B, reaching the same through the aperture $b$ and through the openings in the cage; but when the water reaches finally the body of the float C it begins to lift the same, until finally when the water rises to the upper highest level intended, which is indicated by the dotted line $k$ in Fig. 1, it has lifted said ball or float C into the position shown by dotted lines in Fig. 1, thereby also lifting the valve $f$ against its seat in the opening $b$, closing the latter and preventing any more water from reaching the tank. Thus the ball or float C serves, together with the valve $f$, with which it is connected, to prevent more water from entering said tank. As soon as it is desired to discharge water from the tank the chain $i$ is pulled and the free end of the lever F thereby drawn downward, thus lifting the valve E from the pipe D and allowing the water to flow out through said pipe D. The same movement of the lever F which causes the lifting of the valve E also serves to press the float C down, because the depression or block $j$ of the lever F, being directly above the float C, forces the latter down when the lever is moved by the pull $i$, and this depression results in forcing the valve $f$ open and allowing a full stream of water to enter the tank. As soon as the pull $i$ is let go the weight of the valve E, assisted, if desired, by any other weight or strain, brings the lever F into the position shown in Fig. 1, causes the ball E to shut the outlet-opening of the tank, and permits the inflow of water through the pipe B until the float C is again raised in manner described, and valve $f$ thereby forced against its seat.

The parts constituting this structure are simple, not liable to get out of order, and not of a character that would produce the disagreeable hissing noise now frequently experienced in such tanks or cisterns.

For convenience of repair we would prefer to screw the enlargement or chamber $a$ to the upper end of the pipe B, as shown in Fig. 1, so that if repair is necessary the said parts can be readily separated for convenience of access.

What we claim, and desire to secure by Letters Patent, is—

1. The combination of the tank A and inlet-pipe B, having enlargement or chamber $a$, provided with an aperture $b$, with the valve $f$, contained within said enlargement or chamber $a$, its stem $e$ passing through the aperture $b$, the float C on the upper end of said stem, and the perforated cage $d$ between the chamber $a$ and float C, said cage serving as a rest for said float, substantially as and for the purpose specified.

2. The combination of the tank A, its inlet-pipe B and outlet-pipe D, valve E, arranged for closing the outlet-pipe, lever F, connected with said valve E, pull $i$, connected with said lever, and block or projection $j$ on said lever, with the float C, carrying downwardly-projecting stem $e$ and valve $f$, water-inlet chamber $a$ on pipe B, said inlet-chamber $a$ having an aperture $b$, through which the stem $e$ passes, all arranged for operation substantially as herein shown and described.

3. The combination of the tank A, its inlet-pipe B and outlet-pipe D, valve E, arranged for closing the outlet-pipe, lever F, connected with said valve E, pull $i$, connected with said lever, and block or projection $j$ on said lever, with the float C, carrying downwardly-projecting stem $e$ and valve $f$, water-inlet chamber $a$ on pipe B, and cage $d$ on said chamber $a$, said inlet-chamber $a$ having an aperture $b$, through which the stem $e$ passes, all arranged for operation substantially as herein shown and described.

GEORGE W. ALDRICH.
JAMES HUESTON.

Witnesses:
HARRY M. TURK,
L. M. WACHSCHLAGER.